United States Patent [19]

Stoll

[11] Patent Number: 4,928,577
[45] Date of Patent: May 29, 1990

[54] PISTON AND CYLINDER UNIT

[76] Inventor: Kurt Stoll, Lenzhalde 72, 7300 Esslingen, Fed. Rep. of Germany

[21] Appl. No.: 235,386

[22] Filed: Aug. 22, 1988

[30] Foreign Application Priority Data

Sep. 17, 1987 [DE] Fed. Rep. of Germany ....... 3731158

[51] Int. Cl.$^5$ ............................................. F16J 1/00
[52] U.S. Cl. .................................... 92/177; 92/192; 92/193; 277/208; 277/165; 384/32
[58] Field of Search ................. 92/5 R, 126, 139, 153, 92/158, 165, 165 PR, 167, 168, 170, 177, 192, 193, 201, 240–245, 248, DIG. 1; 91/1, DIG. 4; 277/208, 209, 211, 165, 138; 384/16, 32

[56] References Cited

U.S. PATENT DOCUMENTS

| 174,317 | 2/1876 | St. John ............................ 277/138 |
| 782,053 | 2/1905 | Reid .................................... 92/193 |
| 1,234,972 | 7/1917 | Trist .................................... 92/193 |
| 2,015,585 | 9/1935 | Bodenlos ......................... 277/208 |
| 2,446,657 | 8/1948 | McLeod et al. . |
| 2,606,086 | 8/1952 | Rappl ............................... 277/208 |
| 2,877,070 | 3/1959 | Lee .................................... 277/165 |
| 2,877,071 | 3/1959 | Arnot ............................... 277/165 |
| 2,935,365 | 5/1960 | Dega ................................. 277/208 |
| 2,983,256 | 5/1961 | Seeloff .............................. 121/38 |
| 3,147,983 | 9/1964 | Neuman et al. ................. 277/165 |
| 3,180,236 | 4/1965 | Becket . |
| 3,396,976 | 8/1968 | Reinhoudt et al. ............ 92/162 R |
| 3,656,414 | 4/1972 | Muller .............................. 92/193 |
| 4,378,726 | 4/1983 | Stoll . |

FOREIGN PATENT DOCUMENTS

| 2315016 | 10/1974 | Fed. Rep. of Germany . |
| 2320736 | 2/1975 | Fed. Rep. of Germany . |
| 2917232 | 11/1979 | Fed. Rep. of Germany ....... 92/5 R |
| 2947516 | 1/1981 | Fed. Rep. of Germany . |
| 2828344 | 8/1983 | Fed. Rep. of Germany . |
| 8519534 | 10/1985 | Fed. Rep. of Germany . |
| 7327490 | 7/1973 | France . |
| 2245865 | 4/1975 | France . |
| 2379971 | 9/1978 | France . |
| 54085 | 10/1942 | Netherlands ........................ 277/208 |
| 802662 | 2/1981 | U.S.S.R. .............................. 92/177 |
| 0971407 | 9/1964 | United Kingdom ................. 384/32 |

Primary Examiner—Robert E. Garrett
Assistant Examiner—Thomas Denion
Attorney, Agent, or Firm—McGlew & Tuttle

[57] ABSTRACT

It is a question of a piston and cylinder unit comprising a cylinder barrel defining a piston space, a piston able to run axially in said barrel with a support action due to a peripheral bearing surface of the barrel. The piston includes at least one annular running belt which is coaxially arranged thereon along part of the length of the piston. The belt has a surface facing radially outwards which makes contact with the inner bearing surface of the barrel with sliding fit to support the piston, while an inwardly directed surface of the belt bears on an outer peripheral surface of the piston, which is spaced from the bearing surface of the barrel. The belt further has an inwardly directed retainer spur fitting into a groove-like peripheral recess in the piston. The belt is made of a material with resiliently elastic properties and is interrupted at one position on its periphery so that in the fitted condition of the belt there is a closed interruption able to be opened out for fitting purposes.

15 Claims, 1 Drawing Sheet

PISTON AND CYLINDER UNIT

FIELD AND BACKGROUND OF THE INVENTION

The invention relates to piston and cylinder units comprising a cylinder barrel whose cylinder space contains a piston which is able to be displaced in the axial direction and runs on the peripheral guide surface of the cylinder space.

During the production of piston and cylinder units it has so far been necessary to fit the piston precisely in the cylinder space or the cylinder bore and for this purpose to precisely machine the surface of the piston so that it has a high quality finish, for the guiding or support function for the piston when displacement in the piston space is performed by its outer surface cooperating with the inner surface of the cylinder barrel which forms a guide or bearing surface. Elaborate manufacture results in high production costs and furthermore owing to the large area of contact between the piston and the cylinder barrel a heavy load will often lead to seizing of the piston, something that is more likely to be encountered when there are considerable changes in the environmental temperature of the unit.

SHORT SUMMARY OF THE PRESENT INVENTION

Accordingly one object of the present invention is to devise a piston and cylinder unit of the initially mentioned type which without any sacrifice in manufacturing accuracy is simpler and cheaper to produce.

A still further aim of the invention is to provide such a piston and cylinder unit which has a longer working life.

Yet another aim of the invention is to provide such a piston and cylinder unit which is less liable to disorders or failure.

In order to achieve these or other objects appearing in the present specification and claims, the piston is surrounded by at least one coaxially aligned annular runner or guide belt extending over part of the length of the piston. The belt surface is turned radially outwards engaging the bearing surface of the cylinder barrel with a sliding fit while its opposite inner surface bears against the outer peripheral surface, which is spaced from the bearing surface of the cylinder barrel, of the piston and has a radially inwardly projecting, circumferential retainer spur, which fits into a groove-like circumferential recess in the piston, and the runner belt is made of a material with resiliently elastic properties and at one point of its periphery has an assembly interruption which is closed in the fitted condition of the belt.

With this arrangement it is no longer possible for the outer peripheral surface of the piston to come into contact with the bearing surface of the cylinder barrel surrounding it and in fact the guiding and support function for the piston is now assumed by the runner belt. This belt is so mounted on the outer peripheral surface of the piston that its outwardly turned bearing or running surface, as seen in the radial direction, stands out from the outer cylindrical surface of the piston so that the latter has a clearance between it and the bearing surface or bore of the cylinder barrel. The advantage of this is that the outer surface of the piston no longer requires any precision machining, that is to say, after the piston has been produced it is not necessary to improve its surface in any way. This reduces the costs of production considerably. The maintenance in position of the runner belt with a T-like cross section may be undertaken in a very simple manner using the retainer spur, which fits into the essentially complementary peripheral recess in the piston. A secure retention in place is ensured by the material of the runner belt having resiliently elastic properties so that no further aid is required to retain the belt in place. The inherent resiliency holds the belt in the peripheral recess. Furthermore, the selection of the material offers the advantage of particularly simple assembly involving pulling the ends of the belt apart at the assembly interruption only to the extent which is necessary to ensure that the belt may be readily slipped over the piston and may then snap into the peripheral recess in the piston like a spring. The belt is thus not in the form of an uninterrupted ring or annulus but rather in the form of a severed ring so that for its manufacture it is only necessay to cut off the desired length of the desired section in the form of material with an indefinite length and to shape it as required by heating in a suitable manner or using some other treatment so that the belt is in the desired annular form. A further advantage is that the runner belt in practice forms a sort of buffer or cushion between the piston and the cylinder bore so that thermal expansion may be allowed for and wear is decreased and the working life enhanced.

According to the invention it is an advantage if the gap in the belt is in the form of a slot which preferably makes an angle of approximately 45° to the axial direction and the peripheral direction of the belt. Owing to this feature the tolerances for the belt length may be made more generous, since discrepancies in the length will be taken up by relative displacement at the gap to a certain degree.

It is furthermore an advantage if the outwardly facing surface of the belt, which runs on the guide or support surface of the cylinder barrel, is provided with at least one well to receive a lubricant such as grease, such well being more especially in the form of a circumferential groove. In accordance with a preferred embodiment of the invention there are two such grooves. The grease is retained in the wells and evenly distributed over the bearing surface during motion of the piston. The result is then a reliable, permanently available lubricating effect.

The material of which the runner belt is manufactured may more especially be a plastic, a material made up of 30% carbon fiber, 15% PTFE and the rest polyamide being more especially preferred.

It is furthermore an advantage if the breadth of the peripheral recess as measured in the length direction of the piston is greater than the breadth of the retainer spur fitted therein so that in the axial direction the belt has a certain amount of play, as for instance 1/10 mm. The result is thus a yielding attachment of the piston which prevents any clamping or binding effect. In this respect it is also an advantage if the depth of the peripheral recess is greater than the height of the retainer spur.

A form of the invention in which the piston has an oval or elliptical cross section, that is to say a non-circular outline, is more particularly suitable if the piston is to be prevented from twisting about its axis. This is more especially the case if it carries a driving magnet, for instance in the form of a piece of permanently magnetic material, which is to drive a switch positioned on the outer surface of the cylinder barrel. In this context the runner belt offers the advantage that it may cover over the drive magnet, which is embedded in the piston. For this purpose the circumferentially extending retainer spur of the runner belt is preferably made with a cutout at a corresponding position so that the magnet is positioned as near as possible to the cylinder barrel bore in order to keep the distance from the externally mounted switches and thus the loss in intensity of the magnetic field as low as possible.

A design which is able to be manufactured at a particularly low price is one in which there is a single piston runner belt that is adjacent to a position half way between the ends of the piston in the axial direction and is flanked on each side by a respective sealing ring.

The invention will now be described in more detail with reference to the embodiments thereof to be seen in the drawing.

DETAILED DESCRIPTION OF THE PREFERRED EMBODIMENTS

Figure 1:
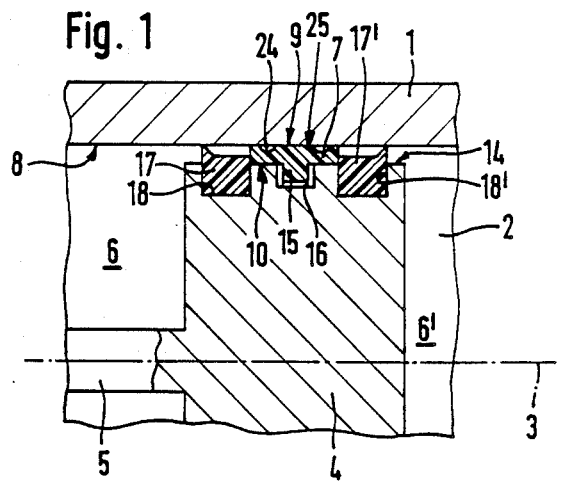
FIG. 1 is a sectional view showing a portion of the piston and cylinder unit in accordance with the invention in longitudinal section, part of the piston and part of the cylinder being apparent.

As especially shown in FIG. 1 the piston and cylinder unit in accordance with the invention comprises a cylinder or cylinder barrel 1 which defines a cylinder space 2 within it, in which a piston 4 is located which is able to move in the axial direction 3 reciprocatingly. In the example illustrated the piston 4 is provided with a piston rod 5 extending from one of its sides. By pressurizing and venting the two pressure spaces 6 and 6' on the two sides of the piston alternately by means of pressure ports which are not shown the piston may be activated, i.e. moved in the axial direction.

Figure 2:
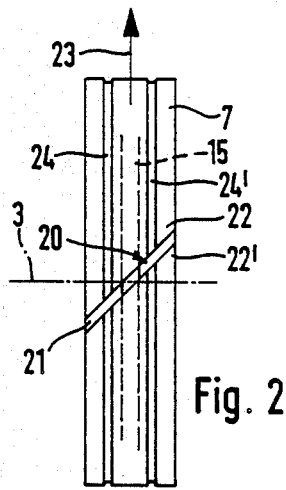
FIG. 2 is plan view of the runner belt in accordance with the invention without the piston.
Figure 3:
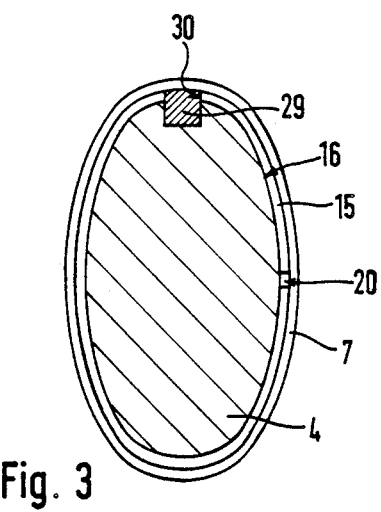
FIG. 3 is a cross sectional view taken through a piston provided with the runner belt, said piston bearing a drive magnet for the operation of some external instrumentality.
Figure 4:
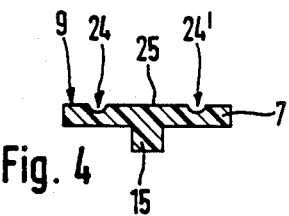
FIG. 4 is a cross sectional view taken through a further, specially adapted form of the piston runner belt.

During its displacement the piston 4 runs on a runner belt 7, which is illustrated in FIGS. 2 through 4, running on the peripheral inner face 8 of the cylinder barrel defining the cylinder space 2. The runner belt 7 is in the form of a ring and extends coaxially around the full outer circumference of the piston 4. The belt surface 9 turned radially outwards towards the cylinder 1 runs on the bearing surface 8 with a running fit, while its oppositely directed inner surface 10 bears on the outer surface 14 of the piston, which is opposite to the bearing surface 8. The outer surface 14 is spaced from and opposite to the bearing surface 8, that is to say, supposing the runner belt were absent, the piston would have a radial clearance with respect to the cylinder barrel. The attachment of the belt on the piston is ensured by means of a retainer spur 15 (see also FIGS. 3 and 4) formed on the inner surface 10 of the belt and extending both radially inwards and extending in the the peripheral direction, that is to say in the length direction of the belt. The spur fits into a suitable groove-like peripheral recess 16 in the piston 4.

A piston may be fitted with one or more runner belts or only with a single runner belt, which then extends practically along the full length of the piston. It is however particularly preferred to have the arrangement as shown in FIG. 1 with a single piston runner belt, which is located at the middle of the piston, that is to say half way between its ends, like the peripheral recess 16, same being flanked in the axial direction by a respective sealing ring 17 and 17'. These sealing rings are each mounted in a peripheral groove 18 and 18', which are located in the two parts of the piston adjacent to the runner belt. The sealing rings span the clearance between thee outer peripheral surface 14 of the piston 4 and the bearing surface 8, such gap or clearance corresponding to the thickness of the runner belt (without the retainer spur).

The runner belt 7 shown in the Figures consists of plastic material, a composition made up of 30% carbon fiber, 15% PTFE (Teflon ®) with the rest in the form of polyamide having been found to have a particularly low rate of wear so that it has a length of life three to five times as long as that of conventional material compounds. At the same time this material has rubber elastic or resiliently elastic properties, which make possible simple fitting of the belt to the piston.

Thus at one point 19 on its periphery the belt is provided with a fitting interruption or gap 20, which is preferably in the form of a slot 21 as is shown in FIG. 2. The runner belt 7 is thus not complete in the circumferential direction, but rather in the form of an interrupted ring, the ends 22 and 22' of the ring practically not opening out owing to the resiliently elastic properties. For fitting the ring is pulled upon so that its ends 22 and 22' are drawn apart somewhat and the belt may then be drawn over the piston until the position of the peripheral recess 16 is reached, into which the retainer spur snaps into the recess like a spring when the ends of the ring are released. After pushing the piston provided with the belt into the cylinder space 2 the ultimate fitted condition will automatically be reached inasfar as the two ring ends are pressed towards each other. In this respect it is an advantage if the length direction of the linear slot is set at an angle both to the axial direction 3 and also to the circumferential direction 23 so that, more especially, there is an angle in each case of approximately 45°. It is then possible for the two ring ends to slide against each other to a certain degree and thus allow for tolerances in the length direction.

A further advantageous development of the runner belt is to be seen in FIGS. 2 and 4 in which it will be seen that the belt has grooves 24 and 24' extending along the full circumference of the belt and which have an axial spacing between them. They serve as a well to receive a lubricant such as grease, which during motion of the piston covers the belt surface 9, forming a bearing surface 25 during motion of the piston, with an even lubricant film. This ensures that the piston is able to run freely.

In the case of another form of the invention not illustrated here there is only one groove to receive the lubricant, such groove then preferably being half way between the ends of the piston. Moreover, it would also be possible to have other forms of wells in the surface of the belt to receive the lubricant, as for instance wells spaced out over the outer periphery of the belt.

A significant advantage of the piston and cylinder unit in accordance with the invention is that the piston is ready for use without any special surface finishing, since it is not its surface which serves as the bearing or running surface and it does not come into contact with the bore of the cylinder barrel.

In the case of the working example of the invention shown in FIG. 1 the breadth of the peripheral recess 16 as measured in the length direction 3 is larger than the breadth of the retainer spur 15 received therein so that there is a gap of approximately 1/10 mm which is shown on an exaggerated scale FIG. 1. Accordingly the runner belt is able to move axially in relation to the piston 4 so that it is able to float to a certain degree, something that prevents the piston jamming in the cylinder. In addition it is also possible, as indicated, for the depth of the peripheral recess 16 to be larger than the height of the retainer spur 15.

Moreover the retainer spur 15 and the peripheral recess 16 cooperating with it are made relatively narrow as compared with the length of the piston and the breadth of the belt.

The piston and cylinder unit shown in the figures is additionally provided wtih a switching system inasfar as the piston carries a drive magnet 29 (see FIG. 3), which is able to operate a switch arranged on the outside of the cylinder and which is not shown. Since the position of the drive magnet 29 is to be kept unchanged, for this reason the piston 4 and correspondingly also the piston space 2 is made oval or elliptical in cross section so that there is no possibility of twisting about the axis. The drive or operating magnet 29 is a permanent one, which is preferably set in the apical zone of the piston 4 and in its outer peripheral surface 14. In order however to ensure that the magnet is as close as possible to the cylinder bore in order not to hinder the transmission of the magnetic field, the runner belt 7 covering the magnet 29 is provided with a cutout 30 adjacent to the magnet into which the magnet is set. The operating magnet 29 is thus protected and covered on the one hand, while on the other hand the precision of the switching action is not impaired thereby.

The use of the runner belt is particularly advantageous in the case of oval pistons, since the configuration thereof is substantially more difficult to produce with an accurate fit than is the case with a circular piston.

I claim:

1. A piston and cylinder unit comprising a cylinder barrel defining a piston space, a piston with a non-circular cross section able to run axially in said barrel with a support action due to a peripheral bearing surface of the barrel, said piston including at least one annular runner belt arranged on said piston extending along at least part of the length of the piston, said belt being coaxially arranged thereon along part of the length of the piston, said belt having a surface facing radially outwardly which makes contact with the inner bearing surface of the barrel with sliding fit to support the piston, an inwardly directed surface of the belt bearing on an outer peripheral surface of the piston, said outer peripheral surface of the piston being spaced from the bearing surface of the barrel, said belt further having an inwardly directed retainer spur fitting into a groove-like peripheral recess in the piston, said belt being made of a material with resiliently elastic properties and being interrupted at one position on its periphery.

2. The piston and cyliner unit as claimed in claim 1 wherein the interruption is in the form of a slot.

3. The piston and cylinder unit as claimed in claim 2 wherein the slot is linear and arranged obliquely to the axial direction and to the circumferential direction.

4. The piston and cylinder unit as claimed in claim 1 wherein the outwardly turned belt surface forming the bearing surface has at least one well therein to receive lubricant.

5. The piston and cylinder unit as claimed in claim 4 wherein the at least one well is in the form of a groove extending along the full circumference of the belt.

6. The piston and cylinder unit as claimed in claim 1 wherein the runner belt consists of plastics.

7. The piston and cylinder unit as claimed in claim 6 wherein the runner belt consists of a approximately 30% carbon fiber, approximately 15% PTFE, the remainder being polyamide.

8. The piston and cylinder unit as claimed in claim 1 wherein the breadth of the peripheral groove as measured in the length direction of the piston is greater than the breadth of the retainer spur so that the latter has axial play in the groove.

9. The piston and cylinder unit as claimed in claim 1 wherein the depth of the peripheral groove is greater than the height of the retainer spur.

10. The piston and cylinder unit as claimed in claim 1 wherein the circumferential extending retainer spur of the runner belt has a cutout at one point which is opposite to a recess in the piston in which a drive magnet is mounted and is covered by the belt.

11. The piston and cylinder unit as claimed in claim 1 comprising a single such runner belt located half way between the ends of the piston, the peripheral outer surface of the piston portions on the two sides of the belt as seen in the axial direction, being opposite to and spaced from the bearing surface of the barrel.

12. The piston and cylinder unit as claimed in claim 1 comprising a single such runner belt located half way between the ends of the piston, the peripheral outer surface of the piston portions on the two sides of the belt as seen in the axial direction, being opposite to and spaced from the bearing surface of the barrel, such surfaces on either side of the belt being furnished with a sealing ring in sealing contact with the barrel bearing surface, said belt being interrupted by a slot at an angle of approximately 45° to the peripheral direction of the belt, said belt having two grooves therein extending along its full peripheral extent to receive lubricant therein, said spur being received in said recess with a clearance allowing axial play of the belt of approximately 1/10 mm.

13. A piston and cylinder unit, comprising: a cylinder barrel defining a piston space; a piston having a non-circular cross section positioned in said barrel for running axially within said barrel supported by an inner peripheral bearing surface; a runner belt positioned on said piston extending along a portion of the length of the piston in an axial direction, said belt being coaxially arranged on said piston, said belt having a surface facing radially outwardly, disposed to make contact with the inner bearing surface of the barrel with a sliding fit to support the piston relative to the inner surface of the barrel, an inwardly directed surface of the belt bearing on an outer peripheral surface of the piston, said outer peripheral surface of the piston being spaced from the bearing surface of the barrel, said belt including an inwardly directed retainer spur fitting into a groove-like peripheral surface defined by said piston, said belt being formed of a material with resiliently elastic properties, said belt being interrupted at one position about its periphery, said piston defining a cut-out region disposed at a position along the length of said piston adjacent said belt, a magnet positioned within said cut-out region, said belt covering said cut-out region and said magnet.

14. A piston and cylinder unit according to claim 13, wherein said belt includes a recess portion, said magnet extending from said cut-out region into said belt recess portion.

15. A piston and cylinder unit comprising a cylinder barrel defining a piston space, a piston with a non-circular cross section able to run axially in said barrel with a support action due to a peripheral bearing surface of the barrel, said piston including at least one annular runner belt arranged on said piston extending along at least part of the length of the piston, said belt being coaxially arranged thereon along part of the length of the piston, said belt having a surface facing radially outwardly which makes contact with the inner bearing surface of the barrel with sliding fit to support the piston, an inwardly directed surface of the belt bearing on an outer peripheral surface of the piston, said outer peripheral surface of the piston being spaced from the bearing surface of the barrel, said belt further having an inwardly directed retainer spur fitting into a groove-like peripheral recess in the piston, said belt being made of a material with resiliently elastic properties and being interrupted at one position on its periphery, said belt being disposed half-way between the ends of said piston defining a first piston portion on one side of the belt and a second piston portion on the other side of the belt, said first and second portions being opposite to and spaced from the bearing surface of the barrel, said first and second portions having surfaces with a sealing ring in sealing contact with the barrel bearing surface, said belt being interrupted by a slot at an angle of approximately 45° with respect to the peripheral direction of the belt, said belt having two grooves therein extending along the full peripheral extent of said belt for receiving lubricant therein, said spur being received in said recess with a clearance allowing axial play of the belt of approximately one/ten mm.

* * * * *